(12) United States Patent
Goodsitt et al.

(10) Patent No.: US 11,570,603 B2
(45) Date of Patent: Jan. 31, 2023

(54) ACTIVATION OF SHORT-RANGE WIRELESS COMMUNICATION VIA REMOTE ACTIVATION SIGNAL

(71) Applicant: Capital One Services, LLC, McLean, VA (US)

(72) Inventors: Jeremy Goodsitt, Champaign, IL (US); Austin Walters, Savoy, IL (US); Anh Truong, Champaign, IL (US); Ernest Kwak, Urbana, IL (US); Galen Rafferty, Mahomet, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 123 days.

(21) Appl. No.: 17/129,371

(22) Filed: Dec. 21, 2020

(65) Prior Publication Data

US 2022/0201448 A1 Jun. 23, 2022

(51) Int. Cl.
| | |
|---|---|
| *H04W 4/80* | (2018.01) |
| *H04W 12/06* | (2021.01) |
| *H04W 76/14* | (2018.01) |
| *H04W 8/24* | (2009.01) |

(52) U.S. Cl.
CPC ............... *H04W 4/80* (2018.02); *H04W 8/24* (2013.01); *H04W 12/06* (2013.01); *H04W 76/14* (2018.02)

(58) Field of Classification Search
CPC ..... H04W 4/40; H04W 4/023; H04W 64/006; H04W 36/0088; H04W 28/22; G01S 5/0289; G06Q 20/347; G07C 9/00769
See application file for complete search history.

(56) References Cited

U.S. PATENT DOCUMENTS

| | | | |
|---|---|---|---|
| 11,044,961 B1 * | 6/2021 | Craig | ..................... A42B 3/046 |
| 2016/0203344 A1 * | 7/2016 | Fink | ....................... G06F 21/86 |
| | | | 726/26 |
| 2018/0312105 A1 * | 11/2018 | Bartell | ................... B60Q 1/445 |

\* cited by examiner

*Primary Examiner* — Iqbal Zaidi
(74) *Attorney, Agent, or Firm* — Harrity & Harrity, LLP

(57) ABSTRACT

In some implementations, a device may receive an activation signal transmitted by an activator device. The device may determine that a first signal pattern of the activation signal matches a second signal pattern associated with activating the Bluetooth capability of the device. The device may activate the Bluetooth capability of the device based on determining that the first signal pattern matches the second signal pattern. The device may communicate with a wireless communication device using the Bluetooth capability of the device based on activating the Bluetooth capability of the device.

20 Claims, 7 Drawing Sheets

US 11,570,603 B2

ACTIVATION OF SHORT-RANGE WIRELESS COMMUNICATION VIA REMOTE ACTIVATION SIGNAL

BACKGROUND

A personal area network (PAN) is a computer network for interconnecting electronic devices centered on a particular workspace. A wireless PAN is a PAN that is typically carried over a low-powered, short-range wireless network technology, such as Bluetooth, Zigbee, an infrared data association (IrDA) communication protocol, or wireless universal serial bus (USB), among other examples. Bluetooth, for example, is a packet-based protocol with a master/slave architecture, in which a master device may pair with and communicate with one or more slave devices.

SUMMARY

In some implementations, a device for remote activation of Bluetooth includes one or more memories, and one or more processors, communicatively coupled to the one or more memories, configured to: receive, from an activator device, an activation signal having a signal pattern; authenticate the activation signal based on the signal pattern of the activation signal; and activate a Bluetooth capability based on authenticating the activation signal.

In some implementations, a method of remotely activating a Bluetooth capability of a device includes receiving, by the device, an activation signal transmitted by an activator device; determining that a first signal pattern of the activation signal matches a second signal pattern associated with activating the Bluetooth capability of the device; activating the Bluetooth capability of the device based on determining that the first signal pattern matches the second signal pattern; and communicating with a wireless communication device using the Bluetooth capability of the device based on activating the Bluetooth capability of the device.

In some implementations, an activator device for remote activation of Bluetooth of a user device includes one or more memories, and one or more processors, communicatively coupled to the one or more memories, configured to determine a signal pattern associated with activating a Bluetooth capability of the user device; and one or more output components configured to transmit, to the user device, an activation signal, that includes the signal pattern, to cause the user device to activate the Bluetooth capability of the user device.

DETAILED DESCRIPTION

Figure 1A:
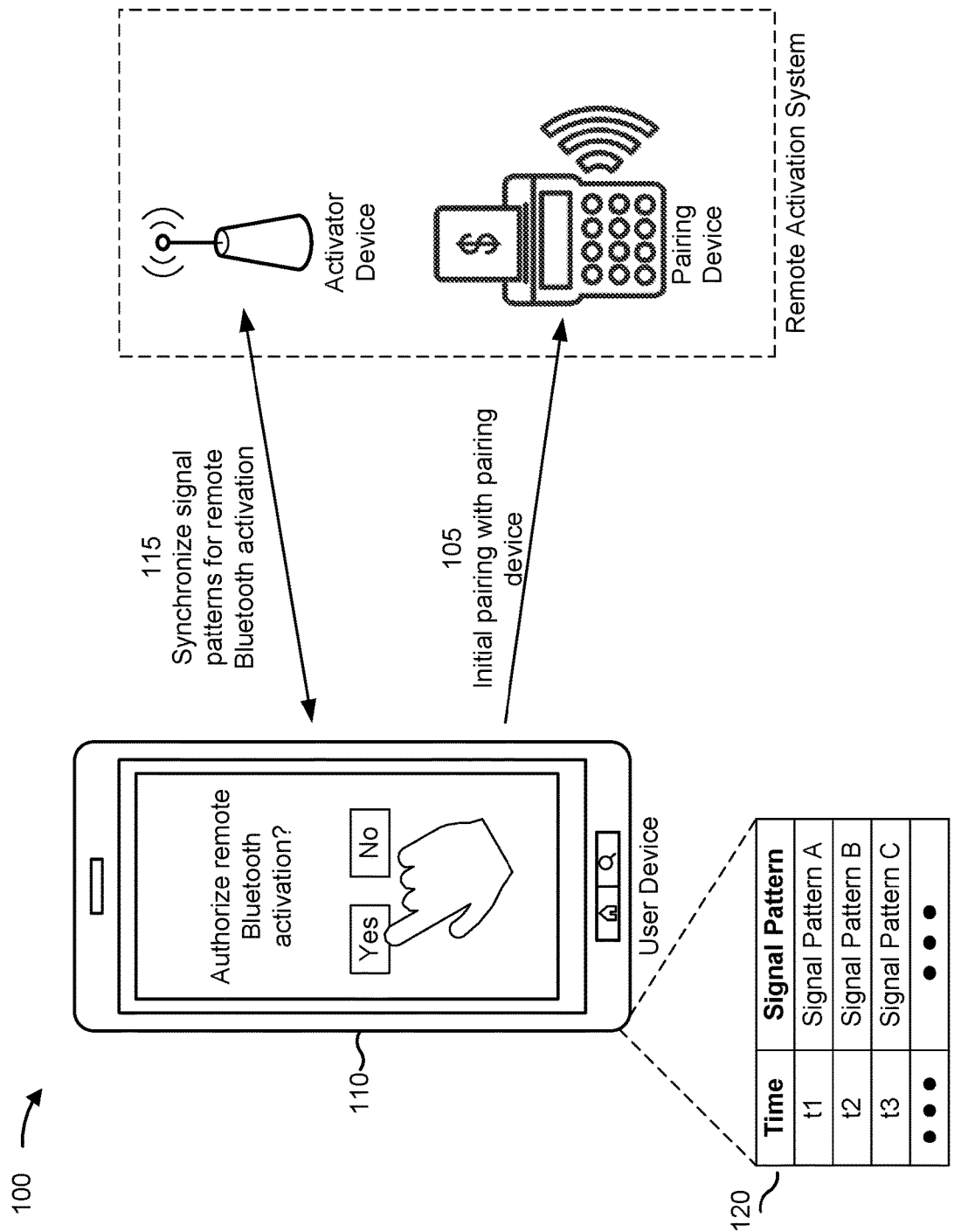
FIGS. 1A-1C are diagrams of an example implementation relating to activation of short-range wireless communication via a remote activation signal.

The following detailed description of example implementations refers to the accompanying drawings. The same reference numbers in different drawings may identify the same or similar elements.

Short-range wireless communication technologies, such as near field communication (NFC), Bluetooth, Bluetooth low energy (BLE), or other personal area network (PAN) protocols, may be used to allow wireless communication between different electronic devices. In some cases, short-range wireless communication technologies may be used to facilitate contactless transactions between a user device and transaction terminals, such as point of sale (PoS) terminals, automated teller machines (ATMs), or access terminals (e.g., locking mechanisms for doors, gates, rooms, or safes), among other examples. Short-range wireless communication capabilities of a user device, such as a smartphone, tablet, or wearable device, can typically be turned on and turned off by a user. For example, a user may turn off a short-range wireless communication capability of a user device when the user device is not using the short-range wireless communication capability in order to reduce power consumption by the user device. However, when the short-range wireless communication capability of the user device is turned off, the user device cannot communicate with other devices via the short-range wireless communication capability, and therefore, may not be able to utilize services, such as contactless transactions, available via short-range wireless communication with other devices.

Some implementations described herein enable remote activations of a short-range wireless communication capability of a user device via a remote activation signal. An activator device may transmit an activation signal having a signal pattern, and the user device may receive the activation signal. The user device may authenticate the activation signal based on the signal pattern, and activate a short-range wireless communication capability based on authenticating the activation signal. The user device may communicate with the activator device and/or another device using the short-range wireless communication capability based on activating the short-range wireless communication capability. As a result, the short-range wireless communication capability of the user device may be automatically activated in situations in which the user device may use the short-range wireless communication capability to communicate with other devices and/or access services available via the short-range wireless communication capability. Thus, the user device may not be prevented from utilizing a service or device pairing available via the short-range wireless communication capability when the short-range wireless communication capability of the user device is left, inadvertently or otherwise, in a deactivated state. Furthermore, this allows a user to leave the short-range wireless communication capability of the user device turned off when not being used, without the user having to manually turn on the short-range wireless communication capability or leave the short-range wireless communication capability turned on, thus reducing power consumption of the user device.

Figure 1B:
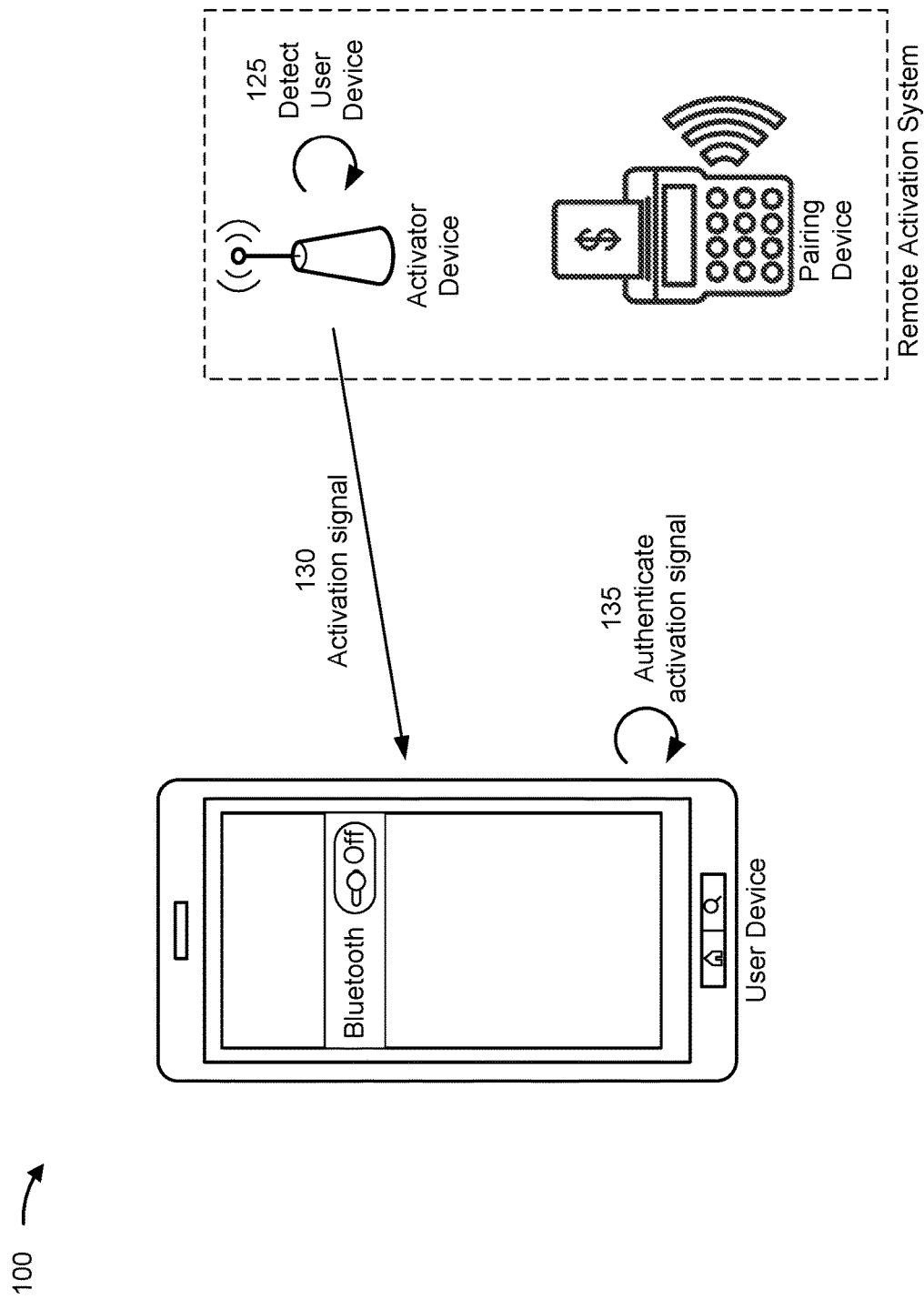
Figure 1C:
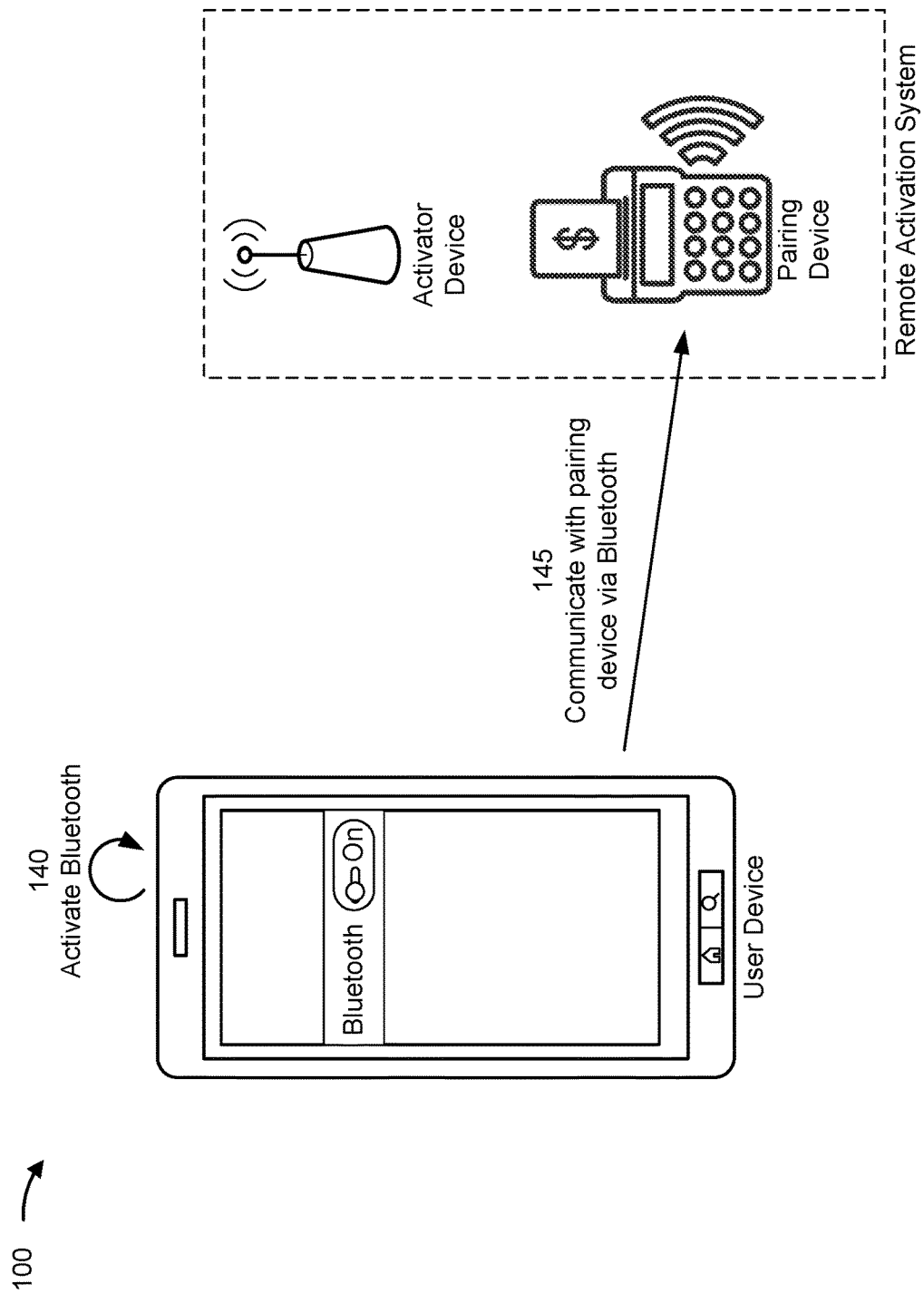

FIGS. 1A-1C are diagrams of an example 100 associated with activation of short-range wireless communication via a remote activation signal. As shown in FIGS. 1A-1C, example 100 includes a user device, an activator device, and a pairing device. These devices are described in more detail in connection with FIGS. 2 and 3.

As shown in FIG. 1A, and by reference number 105, the user device may perform an initial pairing with the pairing device via a short-range wireless communication protocol. For example, the user device and the pairing device may communicate via a PAN, such as Bluetooth, Zigbee, IrDA, or wireless USB, among other examples, or another short-range wireless communications protocol, such as NFC. As shown in example 100, the user device may pair with and communicate with the pairing device via Bluetooth. Although implementations are described herein in connection with activation of a Bluetooth capability of the user device via a remote activation signal, techniques described herein in connection with FIGS. 1A-1C may be used for remote activation of other PAN capabilities and/or other short-range wireless communication capabilities of the user device.

The user device may detect that the pairing device is within a range of the user device (e.g., a communication range or a communicative proximity), and pair with the pairing device via Bluetooth to enable Bluetooth communication between the user device and the pairing device. In some implementations, the user device may be a Bluetooth master device and the pairing device may be a Bluetooth slave device. In some implementations, the pairing device may be the Bluetooth master device and the user device may be the Bluetooth slave device. The initial pairing between the user device and the pairing device may be based on the user device receiving a user input to pair with the pairing device via Bluetooth.

As further shown in FIG. 1A, and by reference number 110, the user device may receive a user input authorizing remote Bluetooth activation for the user device. In some implementations, the user device may prompt a user to indicate whether or not to authorize remote Bluetooth authorization based on performing the initial pairing with the pairing device. The user may authorize remote Bluetooth activation for pairing with the pairing device. In some implementations, the pairing device may be one of multiple pairing devices in a remote activation system. For example, the remote activation system may include one or more PoS terminals, one or more ATMs, one or more access terminals, or one or more wireless speakers, among other examples. In this case, the user may authorize remote Bluetooth activation for pairing with the pairing device or the user may authorize Bluetooth activation for pairing with any of the pairing devices in the remote activation system.

In some implementations, authorization of remote Bluetooth activation for the user device may be performed independently of the initial pairing with the pairing device. For example, the user may set a setting of the user device to authorize remote Bluetooth activation for all Bluetooth pairings. In some implementations, the user device may be configured with a default setting to allow remote Bluetooth activation.

As further shown in FIG. 1A, and by reference number 115, the user device and the activator device may synchronize signal patterns for remote Bluetooth activation. The activator device may be part of the remote activation system associated with the pairing device. In some implementations, the activator device and the pairing device may be included in the same device. In some implementations, the activator device and the pairing device may be included in different devices. The remote activation system may include one or multiple activator devices and one or multiple pairing devices.

The activator device may transmit activation signals with time-varying signal patterns to cause the user device and/or other user devices to activate a Bluetooth capability. In some implementations, the activator device may follow a schedule for varying the signal pattern of the activation signal. For example, the activator device may switch the signal pattern at regular or irregular time intervals. In this case, the activator device may transmit, to the user device, information identifying the set of signal patterns used by the activator device and a respective timing associated with each signal pattern in the set of signal patterns. In some implementations, the timing may be a time and/or duration for using each signal pattern relative to a current time at which the synchronization is being performed. In some implementations, the timing may be based on an absolute time, such as the time of day. In this case, the user device and the activator device may synchronize to an external clock for determining the absolute time (e.g., based on a global positioning system and/or based on synchronization signals from a wireless access point, such as a base station, among other examples).

In some implementations, the activator device may determine a signal pattern to transmit at a particular time, and/or a duration for using the signal pattern, using an algorithm based on the current time (e.g., based on an external clock). In this case, the activator device may transmit, to the user device, information identifying the algorithm used to determine the signal pattern based on the current time. In some implementations, the activator device may transmit, to the user device, an indication of an initial signal pattern to be used to activate the Bluetooth capability of the user device. In this case, once the initial signal pattern is used to activate the Bluetooth capability of the user device, and the user device pairs with the pairing device again or another pairing device in the remote activation system, the activator device may transmit a next signal pattern to be used to activate the Bluetooth capability of the user device.

In some implementations, the activator device may transmit, to the user device, information that identifies time-varying signal patterns that are specific to the user device (e.g., based on a user device identifier associated with the user device). In some implementations, the activator device may transmit, to the user device, information that identifies time-varying signal patterns to be broadcast by the activator device and to be received by the user device or any other device within a range of the activator device.

The activation signal may be any signal that can be transmitted using a particular signal pattern or include information indicating a particular signal pattern. In some implementations, the activation signal may be a digital signal transmitted via a wireless local area network, such as a Wi-Fi network. In this case, the signal pattern may be a digital key included in the activation signal. The digital key may be a numeric sequence or a binary sequence, and the activator device may vary the digital key over time. In this case, the activator device may transmit, to the user device, information identifying a time-varying set of digital keys to be used by the activator device. In some implementations, the activator device may transmit an activation signal including a digital key via a short messaging service (SMS) message or via a wide area network (e.g., a wireless wide area network), such as a cellular network.

In some implementations, the activation signal may be an acoustic signal, and the signal pattern may be an acoustic signal pattern of the acoustic signal. In this case, the activator device may transmit, to the user device, information identifying a time-varying set of acoustic signal patterns to be used by the activator device. In some implementations, the activation signal may be a light signal, and the signal pattern may be a light pattern. In this case, the activator device may transmit, to the user device, information identifying a time-varying set of light patterns to be used by the activator device. In some implementations, the activation signal may be a vibration signal, and the signal pattern may be a vibration pattern. In this case, the activator device may transmit, to the user device, information identifying a time-varying set of vibration patterns to be used by the activator device.

As further shown in FIG. 1A, and by reference number 120, the user device may store information identifying the time-varying signal patterns to be used by the activator device. For example, the user device may store, in a data structure, a set of signal patterns (e.g., "Signal Pattern A," "Signal Pattern B," and "Signal Pattern C" in FIG. 1A) and timing information (e.g., "t1," "t2," and "t3" in FIG. 1A) associated with the signal patterns. In some implementations, the user device may store information identifying an algorithm for determining the signal pattern at a particular time.

As shown in FIG. 1B, at a time subsequent to the initial pairing with the pairing device, the Bluetooth capability of the user device may be deactivated. For example, a user of the user device may have turned off the Bluetooth capability of the user device and/or the Bluetooth capability may have been deactivated for power saving. As shown by reference number 125, the activator device may detect a presence of the user device. For example, the activator device may determine that the user device is within a range of the activator device and/or a range of the pairing device (e.g., a communication range and/or communicative proximity). In some implementations, the activator device may detect the presence of the user device on a wireless local area network. In some implementations, the activator device may detect the physical presence of the user device or a user of the user device. For example, the activator device may detect the physical presence of the user device or a user of the user device using one or more sensors, such as a proximity sensor, a motion sensor, a radar sensor, a light and detection ranging (LIDAR) sensor, and/or a vibration sensor.

As further shown in FIG. 1B, and by reference number 130, the activator device may transmit an activation signal, and the user device may receive the activation signal. In some implementations, the activator device may broadcast the activation signal, to be received by any devices within the range of the activator device. In some implementations, the activator device may transmit the activation signal in a transmission (e.g., via a wireless local area network or SMS message) that is specific to the user device. In some implementations, the activator device may transmit the activation signal based on detecting the presence of the user device. For example, the activator device may broadcast the activation signal and/or transmit the activation signal to the user device based on detecting the presence of the user device on a local area network. Additionally, or alternatively, the activator device may broadcast the activation signal based on sensor-based detection of the presence of an object (e.g., the user device, the user, or any other object) in the range of the activator device.

In some implementations, the activator device may transmit the activation signal regardless of whether the user device (or another object) is detected. For example, the activator device may periodically transmit the activation signal at a regular time interval. In this case, the activator device may or may not perform detection of the user device.

The activator device may include one or more output components configured to transmit the activation signal. In some implementations, the activator device may transmit the activation signal via a wireless local area network, for example, using an antenna of the activator device. In this case, an antenna of the user device may receive the activation signal. In some implementations, the activator device may transmit an acoustic activation signal, for example, using one or more speakers of the activator device. In this case, a microphone of the user device may receive the activation signal. In some implementations, the activator device may transmit a light signal, for example, using a light source of the activator device. For example, the light signal may be a light signal in the visual spectrum or a light signal in the invisible spectrum, such as an infrared light signal or an ultraviolet light signal. In this case, a light sensor of the user device may receive the light signal. In some implementations, the activator device may transmit a vibration signal, for example, using a vibration motor of the activator device. In this case, a vibration sensor of the user device may receive the vibration signal, for example by sensing the vibrations on a surface that is in contact with the activator device.

The activator device may determine a signal pattern (e.g., digital key, acoustic signal pattern, light pattern, or vibration pattern) associated with activating Bluetooth in the user device, and may transmit the activation signal with the determined signal pattern. For example, the activator device may determine a current signal pattern of a set of time-varying signal patterns based on a schedule for switching between the signal patterns in the set of time-varying signal patterns. As described above, the activator device may synchronize the schedule for switching between the signal patterns with the user device. In some implementations, the activator device may determine the current signal pattern using an algorithm based on the current time.

As further shown in FIG. 1B, and by reference number 135, the user device may authenticate the received activation signal based on the signal pattern in the received activation signal (referred to herein as the "received signal pattern"). In some implementations, the user device may determine whether the received signal pattern (e.g., a first signal pattern) matches a stored signal pattern (e.g., a second signal pattern) associated with remote Bluetooth activation. The stored signal pattern may be a signal pattern indicated in information received from the activator device, as described elsewhere herein (e.g., in connection with reference number 115 of FIG. 1A). For example, the user device may determine whether the received signal pattern matches a current signal pattern of a stored time-varying set of signal patterns based on the timing information associated with the stored time-varying set of signal patterns. In some implementations, the user device may determine a reference signal pattern based on the current time using an algorithm received from the activator device, and determine whether the received signal pattern matches the reference signal pattern.

In example 100 of FIGS. 1A-1C, the user device uses information received from activator device during synchronization to authenticate the activation signal. In some implementations, the user device may perform the authentication without first performing the synchronization. For example, the activator device may communicate with a network device, such as a server, via a network. The network device may control the activator device to vary the signal pattern, or the activator device may notify the network device of the current signal pattern when the activator device switches the signal pattern. The user device, for example via an application executing on the user device, may communicate with the network device and receive information that identifies the current signal pattern from the network device. For example, the user device may request the current signal pattern from the network device based on receiving the activation signal from the activator device. The user device may authenticate the received activation signal by determining whether the received signal pattern is the same as the current signal pattern received from the network device.

As shown in FIG. 1C, and by reference number 140, the user device may activate the Bluetooth capability. The user device may activate (turn on) the Bluetooth capability of the user device based on receiving and authenticating the activation signal. In some implementations, the user device may activate the Bluetooth capability without notifying the user and/or without receiving any user input. In some implementations, the user device may generate a notification to alert the user that Bluetooth has been activated. For example, the user device may display a pop-up notification on a display of the user device and/or play a sound notification to alert the user that Bluetooth has been activated. In some implementations, the user device may display a prompt that requests that the user approve the activation of Bluetooth. In this case, the user device may activate the Bluetooth capability based on receiving user input indicating that the user approves the activation of Bluetooth.

As further shown in FIG. 1C, and by reference number 145, the user device may communicate with the pairing device via Bluetooth. For example, the user device may automatically detect the pairing device and pair with the pairing device via Bluetooth based on activating the Bluetooth capability. Once paired, the user device may communicate with the pairing device via Bluetooth. In some implementations, the user device may communicate with the pairing device to perform a contactless transaction, such as a financial transaction (e.g., with a PoS terminal or an ATM), or to gain access to an access controlled entry via an access control terminal, among other examples.

Although implementations are described herein in connection with activating Bluetooth or another short-range communication capability of a user device, techniques described herein may be used to activate other types of communication capabilities of a user device. For example, in some implementations, an activator device may transmit, to a user device, an activation signal to cause the user device to activate a capability to communicate via a wireless local area network (e.g., a Wi-Fi capability) or a cellular network. In this case, in addition to the examples described above, the activator may transmit the activation signal via a PAN, such as Bluetooth, NFC, or another short-range wireless communication protocol. In some implementations, the activator may transmit the activation signal using one type of short-range wireless communication protocol (e.g., a first wireless communication protocol) to cause the user device to activate a capability to communicate using another type of short-range wireless communication protocol (e.g., a second wireless communication protocol).

Using the techniques described herein, a user device may activate a short-range wireless communication capability based on receiving a remote activation signal transmitted by an activation device. Thus, the user device may be enabled to use a service or device pairing available via the short-range wireless communication capability when the short-range wireless communication capability of the user device is left, inadvertently or otherwise, in a deactivated state. Furthermore, this allows a user to leave the short-range wireless communication capability of the user device turned off when not being used, without the user having to manually turn on the short-range wireless communication capability or leave the short-range wireless communication capability turned on, thus reducing power consumption of the user device.

As indicated above, FIGS. 1A-1C are provided as an example. Other examples may differ from what is described with regard to FIGS. 1A-1C.

Figure 2:
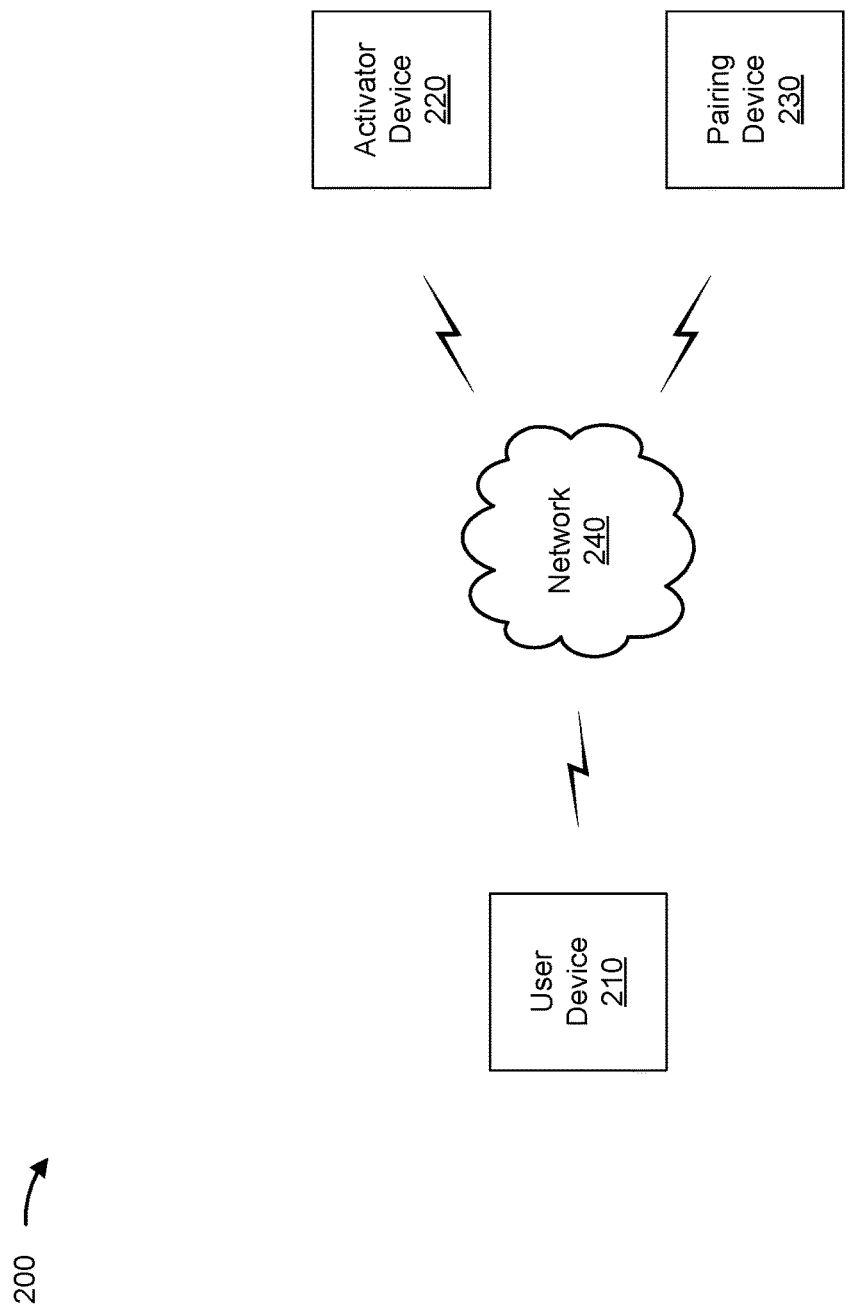
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an activator device 220, a pairing device 230, and a network 240. Devices of environment 200 may interconnect via wired connections, wireless connections, or a combination of wired and wireless connections.

The user device 210 includes one or more devices capable of receiving, generating, storing, processing, and/or providing information associated with activating short-range wireless communication via a remote activation signal, as described elsewhere herein. The user device 210 may include a communication device and/or a computing device. For example, the user device 210 may include a wireless communication device, a mobile phone, a user equipment, a laptop computer, a tablet computer, a handheld gaming device, a wearable communication device (e.g., a smart wristwatch, a pair of smart eyeglasses, a head mounted display, or a virtual reality headset), or a similar type of device.

In some implementations, the user device may be a transaction device that includes one or more devices capable of being used for an electronic transaction. In some implementations, the transaction device may include a transaction card (or another physical medium with integrated circuitry) capable of storing and communicating account information, such as a credit card, a debit card, a gift card, an ATM card, a transit card, a fare card, and/or an access card. In some implementations, the transaction device may be a mobile device or may be integrated into the mobile device. The transaction device may store account information, which may be used in connection with an electronic transaction. The account information may include, for example, an account identifier that identifies an account (e.g., a bank account or a credit account) associated with the transaction device (e.g., an account number, a card number, a bank routing number, and/or a bank identifier), a cardholder identifier (e.g., identifying a name of a person, business, or entity associated with the account or the transaction device), expiration information (e.g., identifying an expiration month and/or an expiration year associated with the transaction device), and/or a credential (e.g., a payment token). In some implementations, the transaction device may store the account information in tamper-resistant memory of the transaction device, such as in a secure element. As part of performing an electronic transaction, the transaction device may transmit the account information to a transaction terminal using a communication component, such as a magnetic stripe, an integrated circuit (IC) chip (e.g., a EUROPAY®, MASTERCARD®, VISA® (EMV) chip), and/or a contactless communication component (e.g., an NFC component, a radio frequency (RF) component, a Bluetooth component, and/or a BLE component). Thus, the transaction device and a transaction terminal may communicate with one another by coming into contact with one another (e.g., using a magnetic stripe or an EMV chip) or via contactless communication (e.g., using NFC).

The activator device 220 includes one or more devices capable of receiving, generating, storing, processing, and/or providing information associated with activation of short-range wireless communication via a remote activation signal, as described elsewhere herein. The activator device 220 may include a communication device and/or a computing device. For example, the activator device 220 may include a wireless communication device, a wireless beacon, a wireless transmitter, or a similar type of device.

The pairing device 230 includes one or more devices capable of receiving, generating, storing, processing, and/or providing information associated with activation of short-range wireless communication via a remote activation signal, as described elsewhere herein. The pairing device 230 may include one or more devices capable of communicating with the user device 210 via short-range wireless communication, such as Bluetooth, BLE, and/or NFC. In some implementations, the pairing device may include one or more devices capable of pairing with the user device to communicate via short-range wireless communication. The pairing device 230 may include a communication device and/or a computing device. For example, the pairing device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), wireless speaker, wireless headset, ATM, PoS terminal, or a similar type of device.

In some implementations, the pairing device 230 may include a transaction terminal that includes one or more devices capable of facilitating an electronic transaction. For example, the transaction terminal may include a PoS terminal, a payment terminal (e.g., a credit card terminal, a contactless payment terminal, a mobile credit card reader, or a chip reader), and/or an ATM. In some implementations, the pairing device 230 may include an access control terminal (e.g., used to control physical access to a secure area), such as an access control panel used to control an access-controlled entry (e.g., a turnstile, a door, a gate, or another physical barrier).

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200. In some implementations, the network 240 includes multiple networks, and a first network (e.g., a WLAN) may be used to activate communications via a second network (e.g., a Bluetooth network), as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
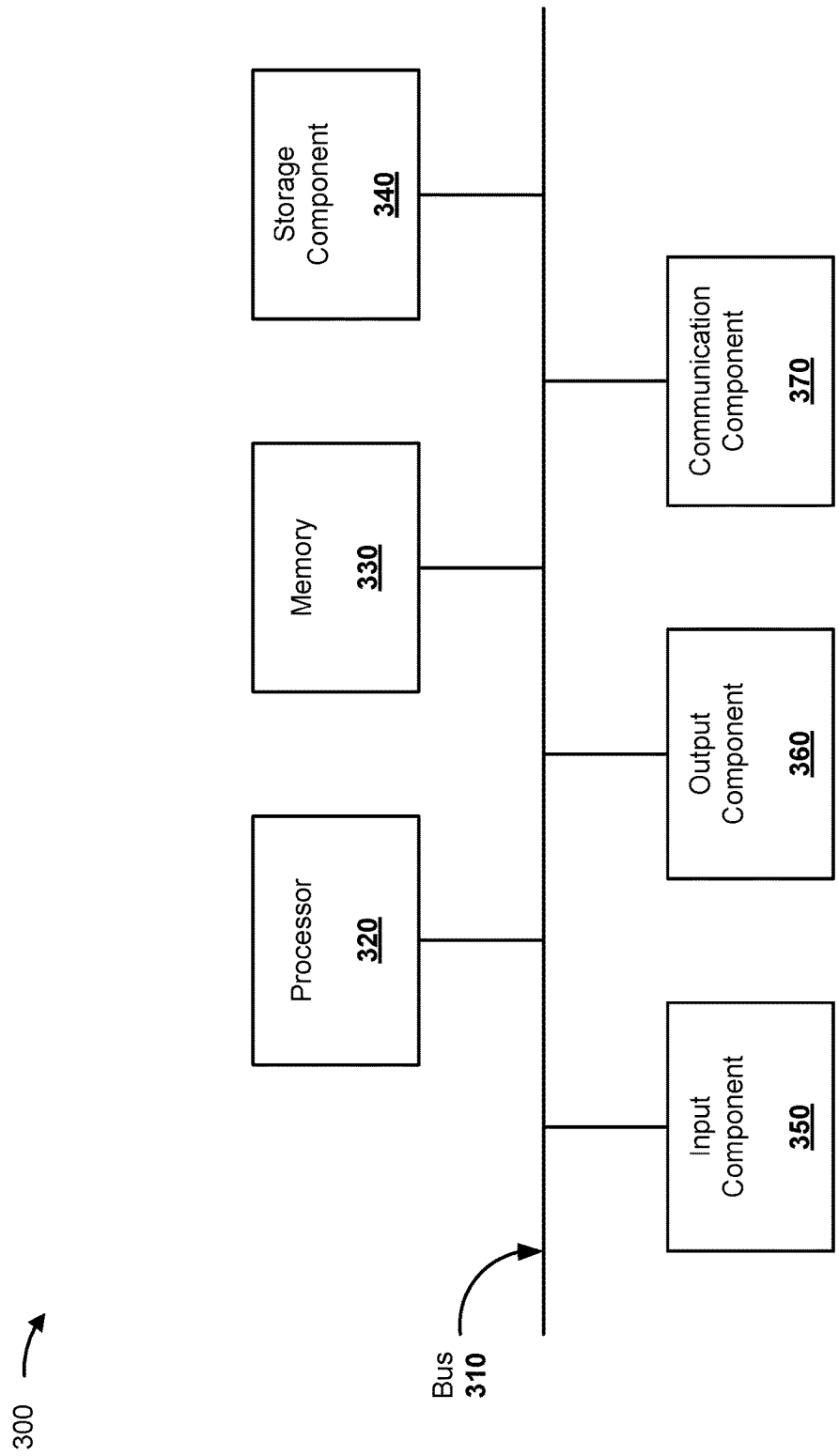
FIG. 3 is a diagram of example components of one or more devices of FIG. 2.

FIG. 3 is a diagram of example components of a device 300, which may correspond to the user device 210, the activator device 220, and/or the pairing device 230. In some implementations, the user device 210, the activator device 220, and/or the pairing device 230 may include one or more devices 300 and/or one or more components of device 300.

As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
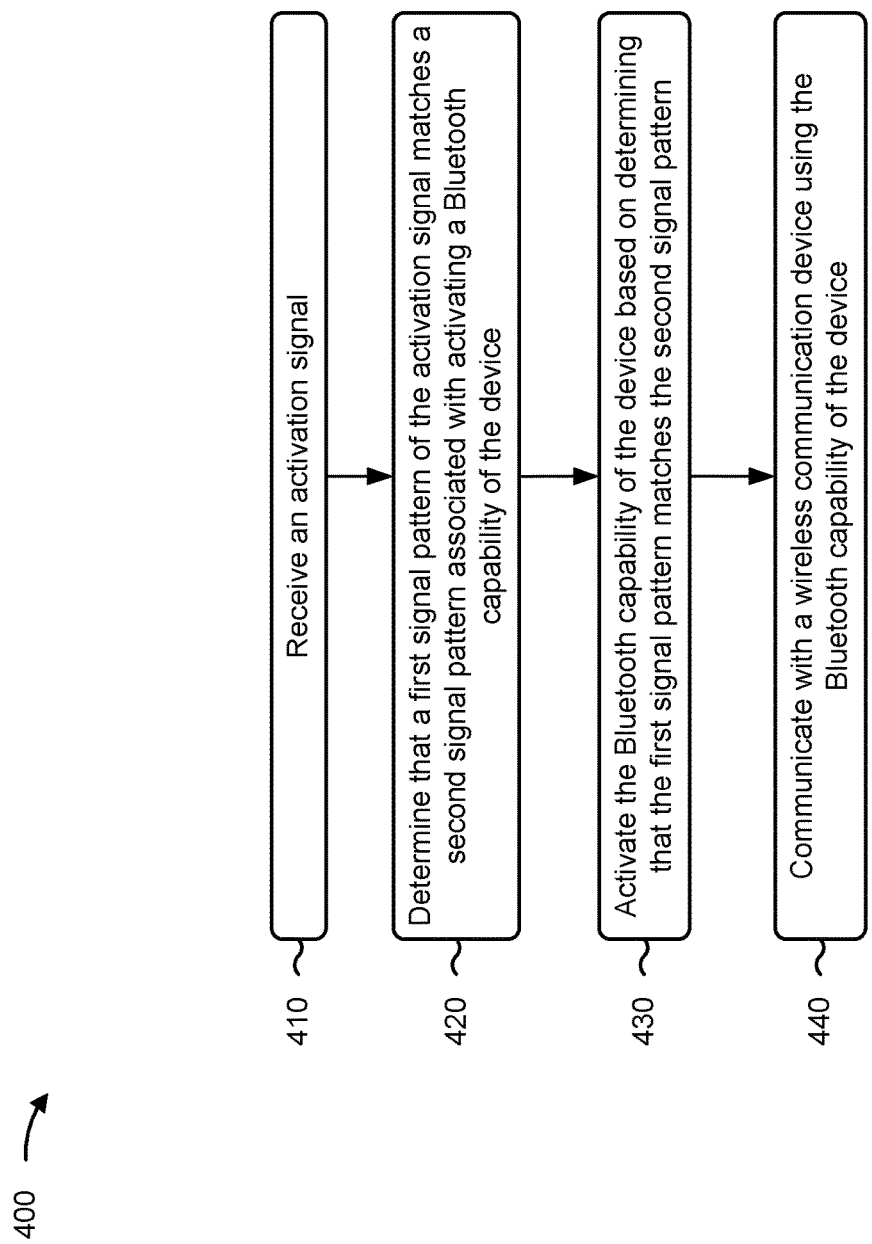
FIGS. 4 and 5 are flowcharts of example processes relating to activation of short-range wireless communication via a remote activation signal.

FIG. 4 is a flowchart of an example process 400 associated with activation of short-range wireless communication via a remote activation signal. In some implementations, one or more process blocks of FIG. 4 may be performed by a device (e.g., user device 210). In some implementations, one or more process blocks of FIG. 4 may be performed by another device or a group of devices separate from or including the device, such as activator device 220 and/or pairing device 230. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an activation signal transmitted by an activator device (block 410). As further shown in FIG. 4, process 400 may include determining that a first signal pattern of the activation signal matches a second signal pattern associated with activating the Bluetooth capability of the device (block 420). As further shown in FIG. 4, process 400 may include activating the Bluetooth capability of the device based on determining that the first signal pattern matches the second signal pattern (block 430). As further shown in FIG. 4, process 400 may include communicating with a wireless communication device using the Bluetooth capability of the device based on activating the Bluetooth capability of the device (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
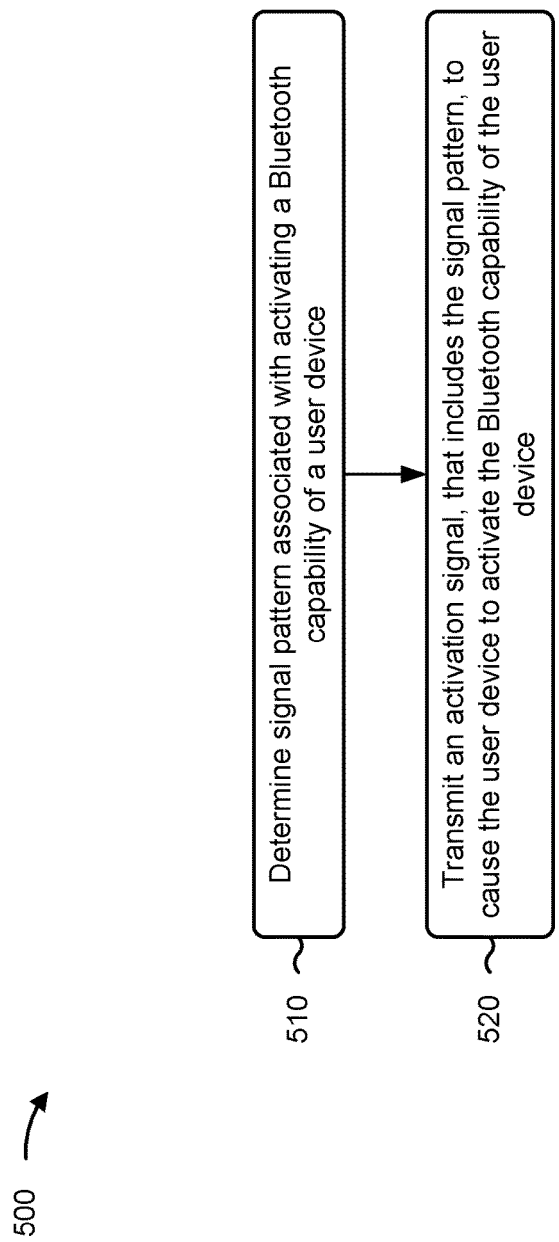

FIG. 5 is a flowchart of an example process 500 associated with activation of short-range wireless communication via a remote activation signal. In some implementations, one or more process blocks of FIG. 5 may be performed by an activator device (e.g., activator device 220). In some implementations, one or more process blocks of FIG. 5 may be performed by another device or a group of devices separate from or including the activator device, such as user device 210 and/or pairing device 230. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include determining a signal pattern associated with activating a Bluetooth capability of a user device (block 510). As further shown in FIG. 5, process 500 may include transmitting, to the user device, an activation signal, that includes the signal pattern, to cause the user device to activate the Bluetooth capability of the user device (block 520).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for remote activation of Bluetooth communication, the device comprising:
one or more memories; and
one or more processors, communicatively coupled to the one or more memories, configured to:
receive, from an activator device and based on the activator device being within a range of the device, an activation signal having a signal pattern;
authenticate the activation signal based on the signal pattern of the activation signal; and
activate a Bluetooth capability based on authenticating the activation signal.

2. The device of claim 1, wherein the one or more processors are further configured to:
communicate with the activator device or another device using the Bluetooth capability based on activating the Bluetooth capability.

3. The device of claim 1, wherein the one or more processors, when receiving the activation signal, are configured to:
receive the activation signal from the activator device via a wireless local area network, wherein the signal pattern includes a digital key.

4. The device of claim 1, wherein the activation signal is an acoustic signal, and the signal pattern is an acoustic signal pattern.

5. The device of claim 1, wherein the activation signal is a light signal, and the signal pattern is a light pattern.

6. The device of claim 1, wherein the one or more processors, when authenticating the activation signal, are configured to:
determine whether the signal pattern of the activation signal matches a stored signal pattern associated with activating the Bluetooth capability.

7. The device of claim 6, wherein the signal pattern of the activation signal and the stored signal pattern associated with activating the Bluetooth capability are time-varying signal patterns.

8. The device of claim 7, wherein the one or more processors are further configured to:
synchronize the stored signal pattern, associated with activating the Bluetooth capability, and the signal pattern of the activation signal.

9. The device of claim 1, wherein the one or more processors are further configured to:
pair with a wireless communication device using the Bluetooth capability based on activating the Bluetooth capability.

10. A method of remotely activating a Bluetooth capability of a device, comprising:
receiving, by the device and based on an activator device being with a range of the device, an activation signal transmitted by the activator device;
determining that a first signal pattern of the activation signal matches a second signal pattern associated with activating the Bluetooth capability of the device;
activating the Bluetooth capability of the device based on determining that the first signal pattern matches the second signal pattern; and
communicating with a wireless communication device using the Bluetooth capability of the device based on activating the Bluetooth capability of the device.

11. The method of claim 10, wherein receiving the activation signal comprises receiving a digital activation signal including a digital key via a wireless local area network, and wherein determining that the first signal pattern matches the second signal pattern comprises:
determining that the digital key matches a current digital key of a time-varying set of digital keys associated with activating the Bluetooth capability of the device.

12. The method of claim 10, wherein receiving the activation signal comprises receiving an acoustic activation signal, and wherein determining that the first signal pattern matches the second signal pattern comprises:
determining that an acoustic signal pattern of the acoustic activation signal matches a current acoustic signal pattern of a time-varying set of acoustic signal patterns associated with activating the Bluetooth capability of the device.

13. The method of claim 10, wherein communicating with the wireless communication device using the Bluetooth capability of the device comprises:
pairing with the wireless communication device using the Bluetooth capability of the device.

14. The method of claim 11, wherein receiving the activation signal comprises receiving a light signal, and wherein determining that the first signal pattern matches the second signal pattern comprises:
determining that a light signal pattern of the light signal matches a current light signal pattern of a time-varying set of light signal patterns associated with activating the Bluetooth capability of the device.

15. An activator device for remote activation of Bluetooth of a user device, the activator device comprising:
one or more memories; and
one or more processors, communicatively coupled to the one or more memories, configured to:
determine a signal pattern associated with activating a Bluetooth capability of the user device, and
detect a presence of the user device in a range of the activator device; and
one or more output components configured to transmit, to the user device, an activation signal, that includes the signal pattern, to cause the user device to activate the Bluetooth capability of the user device based on detecting the presence of the user device in the range of the activator device.

16. The activator device of claim 15, wherein the signal pattern is a digital key associated with activating the Bluetooth capability of the user device, and wherein the one or more output components, when transmitting the activation signal, are configured to:
transmit the activation signal, including the digital key, to the user device via a wireless local area network.

17. The activator device of claim 15, wherein the signal pattern is an acoustic signal pattern associated with activating the Bluetooth capability of the user device, and wherein the one or more output components, when transmitting the activation signal, are configured to:
transmit an acoustic signal with the acoustic signal pattern associated with activating the Bluetooth capability of the user device.

18. The activator device of claim 15, wherein the one or more processors, when detecting the presence of the user device in the range of the activator device, are configured to:
detect the presence of the activator device on a wireless local area network.

19. The activator device of claim 15, wherein the one or more processors, when determining the signal pattern associated with activating the Bluetooth capability of the user device, are configured to:
determine a current signal pattern from a time-varying set of signal patterns associated with activating the Bluetooth capability in the user device.

20. The activator device of claim 15, wherein the one or more processors, when detecting the presence of the user device in the range of the activator device, are configured to:
detect the presence of the user device in the range of the activator device using one or more of a proximity sensor, a motion sensor, a radar sensor, a light and detection ranging sensor, or a vibration sensor.

* * * * *